United States Patent
Procida et al.

(10) Patent No.: US 11,054,067 B2
(45) Date of Patent: Jul. 6, 2021

(54) UNBONDED FLEXIBLE PIPE

(71) Applicant: National Oilwell Varco Denmark I/S, Brondby (DK)

(72) Inventors: Inger-Margrete Procida, Hellerup (DK); Allan Boye Hansen, Sandefjord (NO)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 75 days.

(21) Appl. No.: 15/772,862

(22) PCT Filed: Nov. 1, 2016

(86) PCT No.: PCT/DK2016/050350
§ 371 (c)(1),
(2) Date: May 2, 2018

(87) PCT Pub. No.: WO2017/076412
PCT Pub. Date: May 11, 2017

(65) Prior Publication Data
US 2018/0320803 A1    Nov. 8, 2018

(30) Foreign Application Priority Data

Nov. 3, 2015 (DK) .......................... PA 2015 70711

(51) Int. Cl.
*F16L 11/08* (2006.01)
*C08L 23/14* (2006.01)
(Continued)

(52) U.S. Cl.
CPC .............. *F16L 11/081* (2013.01); *B32B 1/00* (2013.01); *B32B 15/08* (2013.01); *B32B 27/08* (2013.01);
(Continued)

(58) Field of Classification Search
CPC ......... F16L 11/081; C08L 23/12; C08L 23/14; C08L 2203/18; C08L 2205/025; E21B 17/01
(Continued)

(56) References Cited

U.S. PATENT DOCUMENTS

| | | |
|---|---|---|
| 4,567,916 A | 2/1986 | Antal et al. |
| 5,428,706 A | 6/1995 | Lequeux |

(Continued)

FOREIGN PATENT DOCUMENTS

| | | |
|---|---|---|
| EP | 1269057 A | 1/2003 |
| EP | 2296871 A1 | 3/2011 |

(Continued)

OTHER PUBLICATIONS

International Search Report for International Application No. PCT/DK2016/050350, dated Jan. 5, 2017.
(Continued)

*Primary Examiner* — Craig M Schneider
*Assistant Examiner* — David R Deal
(74) *Attorney, Agent, or Firm* — Pearne & Gordon LLP

(57) ABSTRACT

Disclosed is an unbonded flexible pipe for subsea transportation of fluids. The pipe has a length and a centre axis and includes a plurality of layers including at least one polypropylene based layer including a modified polypropylene compound including: at least about 50% by weight of a base polypropylene (base PP) which consists of polypropylene including up to about 10% by weight of one or more co-monomers other than propylene, and at least about 1% by weight of a plastomer including a propylene and at least one co-monomer other than propylene.

16 Claims, 1 Drawing Sheet

(51) Int. Cl.
  *C08L 23/12* (2006.01)
  *C08L 23/08* (2006.01)
  *C08K 7/14* (2006.01)
  *B32B 15/08* (2006.01)
  *B32B 27/22* (2006.01)
  *B32B 27/30* (2006.01)
  *B32B 27/32* (2006.01)
  *B32B 27/08* (2006.01)
  *B32B 1/00* (2006.01)
  *E21B 17/01* (2006.01)

(52) U.S. Cl.
  CPC .............. *B32B 27/22* (2013.01); *B32B 27/30* (2013.01); *B32B 27/32* (2013.01); *C08K 7/14* (2013.01); *C08L 23/0815* (2013.01); *C08L 23/12* (2013.01); *C08L 23/14* (2013.01); *E21B 17/01* (2013.01); *B32B 2307/306* (2013.01); *B32B 2307/544* (2013.01); *B32B 2307/546* (2013.01); *B32B 2307/732* (2013.01); *B32B 2597/00* (2013.01); *C08L 2203/18* (2013.01); *C08L 2205/02* (2013.01); *C08L 2205/025* (2013.01); *C08L 2205/16* (2013.01)

(58) Field of Classification Search
  USPC ........................................................ 138/125
  See application file for complete search history.

(56) References Cited

U.S. PATENT DOCUMENTS

| | | | |
|---|---|---|---|
| 7,605,217 B2 | 10/2009 | Datta et al. | |
| 9,012,001 B2* | 4/2015 | Christensen | F16L 11/10 |
| | | | 428/36.9 |
| 9,057,465 B2* | 6/2015 | Glejbol | F16L 11/08 |
| 2001/0023713 A1* | 9/2001 | Niki | F16L 11/082 |
| | | | 138/126 |
| 2004/0040609 A1* | 3/2004 | Oishi | B32B 1/08 |
| | | | 138/141 |
| 2005/0229991 A1* | 10/2005 | Hardy | F16L 11/083 |
| | | | 138/127 |
| 2008/0255311 A1 | 10/2008 | Chang et al. | |
| 2008/0302437 A1* | 12/2008 | Lovett | F16L 11/10 |
| | | | 138/125 |
| 2009/0151805 A1* | 6/2009 | Martino | F16L 11/088 |
| | | | 138/125 |
| 2009/0171001 A1* | 7/2009 | Lin | C08K 5/01 |
| | | | 524/479 |
| 2009/0291305 A1* | 11/2009 | Ommundsen | B29C 39/006 |
| | | | 428/402 |
| 2011/0253152 A1 | 10/2011 | Lin et al. | |
| 2013/0014849 A1 | 1/2013 | Glejbol | |
| 2013/0025735 A1* | 1/2013 | Kuhmann | B29C 53/581 |
| | | | 138/137 |
| 2013/0032239 A1 | 2/2013 | Kuhmann et al. | |
| 2014/0288228 A1* | 9/2014 | Mehta | C08L 23/14 |
| | | | 524/528 |
| 2015/0099840 A1* | 4/2015 | Glogovsky | C08L 23/12 |
| | | | 524/400 |
| 2015/0315377 A1* | 11/2015 | Mehta | C08L 23/12 |
| | | | 524/525 |
| 2016/0083571 A1* | 3/2016 | Li | C08L 23/142 |
| | | | 428/220 |
| 2017/0299092 A1 | 10/2017 | Larsen et al. | |
| 2018/0231151 A1 | 8/2018 | Straarup | |

FOREIGN PATENT DOCUMENTS

| | | |
|---|---|---|
| GB | 2472257 B | 2/2011 |
| GB | 2473357 A | 3/2011 |
| KR | 10-2007-0068687 A | 7/2007 |
| WO | 99/67560 A1 | 12/1999 |
| WO | 01/61231 A1 | 8/2001 |
| WO | 2005/028198 A1 | 3/2005 |
| WO | 2009/078854 A1 | 6/2009 |
| WO | 2009/153451 A1 | 12/2009 |
| WO | 2011/120525 A1 | 10/2011 |
| WO | 2012/155910 A1 | 11/2012 |
| WO | 2013/044920 A1 | 4/2013 |
| WO | 2014/032674 A1 | 3/2014 |
| WO | 2016/062319 A1 | 4/2016 |
| WO | 2017/025100 A1 | 2/2017 |

OTHER PUBLICATIONS

Danish Search Report for Application No. PA 2015 70711, dated Jun. 7, 2016.
"Recommended Practice for Flexible Pipe", ANSI/API 17 B, fourth Edition, Jul. 2008.
"Specification for Unbonded Flexible Pipe", ANSI/API 17J, Third edition, Jul. 2008.
Extended European Search Report for Application No. 16 86 1639.9, dated Feb. 21, 2019.

* cited by examiner

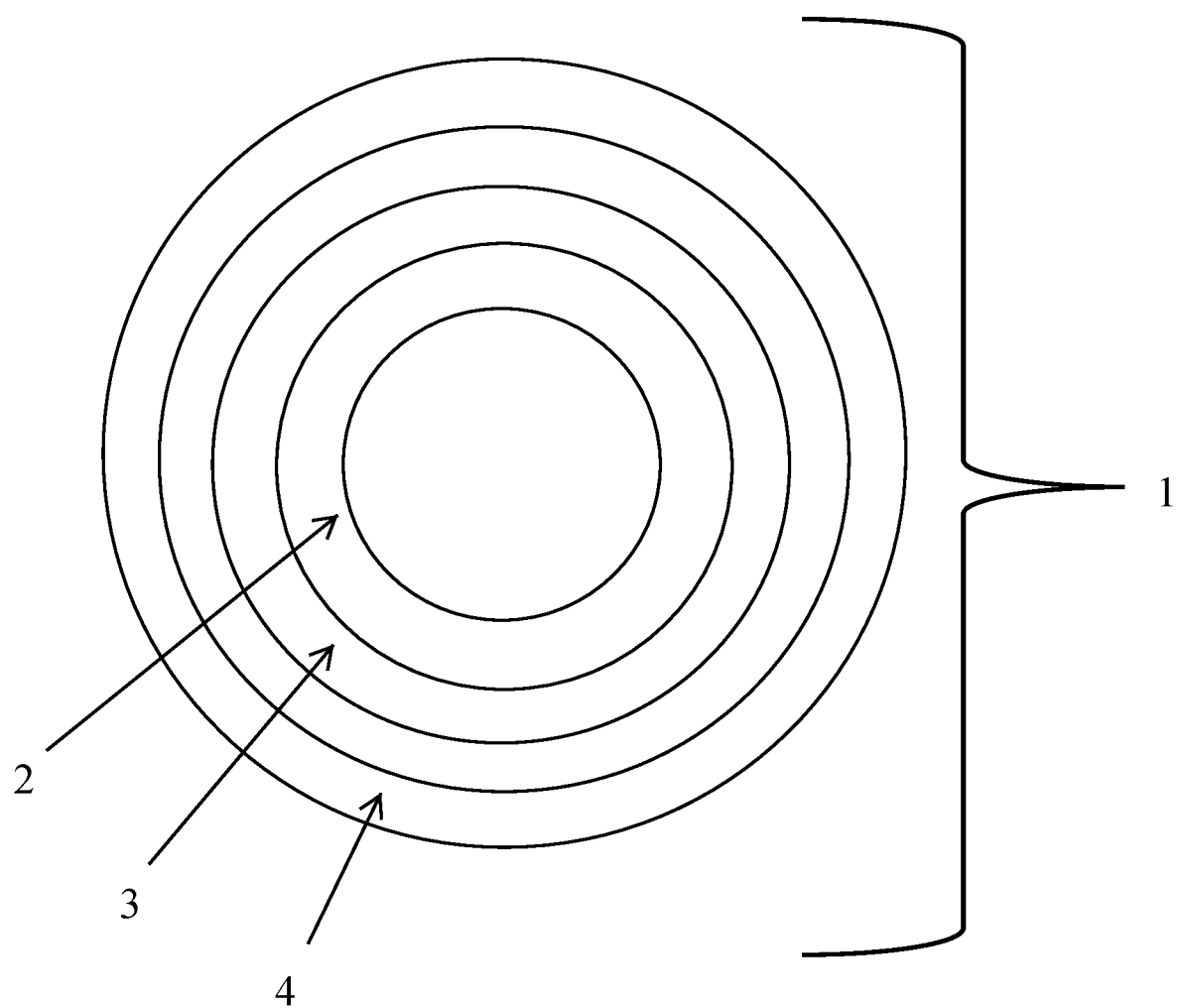

UNBONDED FLEXIBLE PIPE

TECHNICAL FIELD

The present invention relates to an unbonded flexible pipe for subsea transportation of fluids, in particular fluids which are transported at a relative high temperature, such as hydrocarbons, water and mixtures hereof.

BACKGROUND ART

Flexible unbonded pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. Such pipes usually comprise an internal pressure sheath—often referred to as an inner sealing sheath or inner liner, which forms a barrier against the outflow of the fluid which is conveyed in the bore of the pipe, and one or usually a plurality of armour layers. Often the pipe further comprises an outer sheath which is an outer protection layer which provides mechanical protection of the armour layers. The outer sheath may be a sealing layer sealing against ingress of sea water. In certain unbonded flexible pipes one or more intermediate sealing layers are arranged between the armour layers.

Thus, the unbonded flexible pipes are constructed of a number of independent layers, such as helically laid steel and polymeric layers formed around a central bore for transporting fluids. A typical unbonded flexible pipe comprises from the inside and outwards an inner armouring layer known as the carcass, an internal pressure sheath surrounded by one or more armouring layers, such as pressure armouring and tensile armouring, and an outer sheath. Thus, the internal pressure sheath form a bore in which the fluid to be transported is conveyed. When the carcass is omitted, the bore is denoted a smooth bore. When the carcass is present, the bore is denoted a rough bore. The annular space between the internal pressure sheath and the outer sheath is known as the annulus and houses the pressure armouring and the tensile armouring.

In general flexible pipes are expected to have a lifetime of about 20 years in operation.

Unbonded flexible pipes are often used e.g. as riser pipes in the production of oil or other subsea applications. One of the difficulties in the production of crude oil and other fluids from reserves located in deep waters is that the crude oil normally has a temperature which is relatively high. The high temperature may heat the layers in the unbonded flexible pipe, and the temperature in the outer sheath may in some situations become as high as 100° C. or even higher. This will make the outer sheath vulnerable to degradation e.g. by hydrolysis. In general it is desired that the polymer layers of the pipe has a high resistance against heat and chemical degradation.

The British patent GB 2472257 B also discloses a flexible pipe comprising a thermal insulation layer.

DISCLOSURE OF THE INVENTION

An object of the present invention is to provide an unbonded flexible pipe comprising a polymer layer having a high resistance against heat and chemical degradation and at the same time has a high flexibility.

In an embodiment it is a further object to provide an unbonded flexible pipe with a thermal insulation layer of high heat resistivity and high thermal barrier properties.

An additional object of the invention is to provide an unbonded flexible pipe suitable for use in offshore production of petrochemical fluids and comprising a polymer layer having a high heat stability and which simultaneously is relatively simple and economically feasible to produce by extrusion and/or winding and further has a desirable high and stable flexibility over time.

It has been found that the invention and embodiments thereof have a number of additional advantages which will be clear to the skilled person from the following description.

In the following any amounts are by weight unless anything else is specifically stated.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

The term "substantially" should herein be taken to mean that ordinary product variances and tolerances are comprised.

The terms "inside" and "outside" a layer of the pipe are used to designate the relative distance to the axis of the pipe, such that "inside a layer" means the area encircled by the layer i.e. with a shorter axial distance than the layer and "outside a layer" means the area not encircled by the layer and not contained by the layer, i.e. with a shorter axial distance than the layer.

The term "essentially smooth" means herein substantially free of cavities and protrusions which are visible by the average eye.

The term "cross-wound layers" means that the layers comprise wound elongate elements that are wound in opposite direction relatively to the longitudinal axis of the pipe where the angle to the longitudinal axis may be equal or different from each other.

The term "unbonded" means in this text that at least two of the layers including the armour layers and polymer layers are not bonded to each other. In practice the known pipe normally comprises at least two armour layers located outside the internal pressure sheath and optionally an armour structure located inside the internal pressure sheath normally referred to as a carcass.

According to the invention it has been found that the unbonded flexible pipe of the invention comprising at least one polypropylene based layer is suitable for use in a broad temperature range even in a chemically aggressive environment due to the very high chemical and thermal resistance of the modified polypropylene compound.

It has been found that the modified polypropylene compound is highly resistant to hydrolysis even when used at elevated temperatures, such as typically about 120° C., and even up to 130° C. The modified polypropylene compound also has an impact resistance which is higher than the impact resistance of pure polypropylene.

In an embodiment the $T_g$ (glass transition temperature) of the modified polypropylene compound is as low as about minus 40° C. or less. Thus, the polypropylene based layer comprising the modified polypropylene compound may also be used for unbonded flexible pipes adapted for use in environments with low temperatures.

The present invention relates to an unbonded flexible pipe suitable for subsea transportation of fluids. FIG. 1 shows a schematic cross-sectional view of the unbonded flexible pipe 1. The pipe 1 has a length and a centre axis and comprises a plurality of layers, normally including an internal pressure sheath defining a bore 2 in which fluids can be transported and at least one armour layer 3 surrounding the internal pressure sheath.

The unbonded flexible pipe comprises at least one polypropylene based layer comprising a modified polypropylene compound comprising:
- at least about 50% by weight of a base polypropylene (base PP) which consists of polypropylene comprising up to about 10% by weight of one or more co-monomers, and
- at least about 1% by weight of a plastomer comprising a propylene and at least one copolymer other than propylene.

The unbonded flexible pipe may for example be as described in the standard "Recommended Practice for Flexible Pipe", ANSI/API 17 B, fourth Edition, July 2008, and the standard "Specification for Unbonded Flexible Pipe", ANSI/API 17J, Third edition, July 2008, with the difference that it comprises at least one polypropylene based layer, which in practice can be any of the polymer layers of the pipe as further described below.

Advantageously the armour layers comprise or consist of multiple elongated armouring elements that are not bonded to each other directly or indirectly via other layers along the pipe. Thereby the pipe becomes bendable and sufficiently flexible to roll up for transportation.

The modified polypropylene compound comprises base polypropylene which has been modified by incorporation of a plastomer by compounding. Regular grades of polypropylene have a good resistance towards degradation, however, the material is rather stiff and inflexible and although the polypropylene in general is relatively resistant to hydrolysis it has heretofore not been considered desirable for use as layers of an unbonded flexible pipe. It has been found that the incorporation of a plastomer in the base polypropylene provides a modified polypropylene compound with improved properties in respect of strength and flexibility. For the purpose of improving or adapting the modified polyethylene compound for specific layers of the pipe or specific uses of the pipe, the modified polypropylene compound may comprise further components as explained below.

The polypropylene based layer comprising the modified polyethylene compound has been found suitable for use as a layer in the unbonded flexible pipe where it may be subjected to a temperature in a temperature range from about minus 40° C. up to about 120° C. Even at temperatures around 120° C. and in the presence of sea water, degradation by hydrolysis has been found to be very low and in practically negligible.

In general in prior art unbonded flexible pipes regular polypropylene has not been a desired material to apply due to poor to strength and flexibility properties. The polypropylene based layer has been found to be highly suitable for use in the unbonded flexible pipe and has resulted in a unbonded flexible pipe which is suitable for use offshore at a very large temperature interval and it has been found that the unbonded flexible pipe may be spooled at a low temperature without any risk of damage of the polypropylene based layer.

The base polypropylene may in principle be selected from any kind of polypropylene comprising up to about 10% by weight of one or more co-monomers.

The base polypropylene (PP) may comprise polypropylene grades selected from homo, block co-polymers heterophasic, random, random co-polymers, mixtures thereof and combinations thereof. The base pp may for example be in the form of a PP homopolymer, a PP block co-polymer, a PP random co-polymer, any mixtures thereof and/or any combinations thereof.

The base polypropylene used in the modified polyethylene compound preferably has a maximum continuous service temperature of 20° C. or more below the Vicat softening temperature determined according to ASTM D 1525 or alternatively according to ISO 306. This is in particular advantageous when the modified polypropylene is for use with higher temperatures, such as 80° C. or more.

The maximum continuous service temperature is the maximum acceptable temperature up to which mechanical properties (tensile strength, impact strength) of the polymer in question over its estimated lifetime (e.g. 20 years) will not degrade substantially over the reasonable life time of the tested product.

To provide a desired strength to the modified polyethylene compound it has been found that the base polypropylene in the modified polypropylene advantageously have a tensile strength of above 12 MPa according to the method described in ASTM D 638.

Moreover, the base polypropylene in the modified polypropylene advantageously has an elongation at break/elongation at yield from about 25% to about 200% according to the method described in ASTM D 638.

In an embodiment the base polypropylene comprises a random co-polymer comprising up to about 6% by weight of the co-monomer(s), such as from about 1 to about 5% by weight of the co-monomer(s), preferably the base PP comprises none or only one co-monomer. The co-monomer may in be any kind of co-monomer.

The term co-monomer is used to indicate a monomer that forms part of the copolymer and is not propylene.

In an embodiment the base polypropylene comprises a propylene-ethylene co-polymer. In an embodiment the base polypropylene consists essentially of the propylene-ethylene co-polymer with up to about 5% by weight of ethylene.

The base polypropylene advantageously has a Melt Flow Index (MFI) of from about 0.1 to about 8.0 g/10 min (2.16 kg/10 min at 230° C.).

The base polypropylene advantageously has an elongation at yield of at least about 8% and a strength at yield of at least about 20 MPa according to ASTM D638.

The test may advantageously be performed on type IV dog bones at 50 mm/min.

The higher strength required of the polypropylene based layer the more of the base polypropylene is advantageously comprised in the modified polypropylene compound. The modified polypropylene compound comprises at least 50% by weight of the base polypropylene, suitable from about 50% to about 95% of the base polypropylene, such as from about 50% to about 85% of the base polypropylene, and conveniently from about 50% to about 70% of the base polypropylene.

Preferably the modified polypropylene compound comprises at least about 60% by weight of the base polypropylene, such as up to about 95% by weight of the base polypropylene.

The plastomer is advantageously a propylene based plastomer comprising at least 50% by weight of polypropylene. In an embodiment the propylene based plastomer comprises at least about 60% by weight of propylene. In an embodiment the propylene based plastomer comprises up to about 90% by weight of polypropylene.

Suitable propylene based plastomers are described in for example US2008255311 or U.S. Pat. No. 7,605,217.

The propylene based plastomer can be made by any process and includes copolymers made by Ziegler-Natta, CGC (Constrained Geometry Catalyst), metallocene, and nonmetallocene, metal-centered, heteroaryl ligand catalysis. These copolymers include random, block and graft copolymers although preferably the copolymers are of a random configuration. Exemplary propylene based plastomers include Exxon-Mobil VISTAMAXX polymers, and VERSIFY propylene/ethylene plastomers by The Dow Chemical Company.

The density of the propylene based plastomers used in the polypropylene based layer is typically at least about 0.850 and may advantageously be at least about 0.860, such as at least about 0.865 grams per cubic centimeter ($g/cm^3$) as measured by ASTM D-792.

In an embodiment the plastomer is a propylene based plastomer comprising at least one co-monomer selected from C4 to C20 alpha olefins.

Advantageously the plastomer comprises ethylene as comonomer.

Preferably the plastomer comprises at least about 3% by weight of ethylene comonomer, such as from about 5% by weight to about 30% by weight of ethylene comonomer, such as from about 10% by weight to about 20% by weight of ethylene comonomer.

In an embodiment the plastomer is selected from ethylene-alpha olefin co-polymers, ethylene-octene, propylene-ethylene isotactic propylene with random ethylene distribution or any combinations thereof.

In an embodiment the plastomer has a MFI of from about 2.0 to about 15.0 g/10 min (2.16 kg/10 min at 190° C.).

To provide a desired flexibility of the polypropylene based layer it is desired that the plastomer has a shore D hardness of less than about 55 (ASTM D-2240), such as from about 30 to about 52.

In a preferred embodiment the base PP has a tensile strength at yield which is larger than the tensile strength at yield of the plastomer, such as at least about 100% larger.

Further it is generally desired that the base PP has an elongation at yield at least 100% lower than an elongation at yield of the plastomer.

The modified polypropylene compound advantageously comprises at least 2% preferably at least 5% of the plastomer to ensure sufficient flexibility, strength and satisfactory thermal properties of the polypropylene based layer. Thus, the modified polypropylene compound advantageously comprises from about 5% to about 50% of the plastomer, such as from about 5% to about 30% of plastomer, and conveniently from about 5% to about 15% of the plastomer, such as at least about 10% by weight, such as at least about 20% by weight of the plastomer.

As mentioned above the modified polypropylene compound may comprise further components.

The modified polypropylene compound may additionally comprise additives such as pigments, heat stabilisers, process stabilisers, metal deactivators, flame-retardants and/or reinforcement fillers.

In an embodiment the modified polypropylene compound comprises up to about 5% by weight of a stabilizer, such as from about 0.5 to about 4% by weight of the stabilizer. The stabilizers may in principle be any of the well-known stabilizers used in polymer compositions e.g. for increasing stabilization of the polymer during extrusion.

The modified polypropylene compound may for example comprise minor amounts of additives like pigments, heat stabilisers, process stabilisers, metal deactivators and/or flame-retardants. It is generally desired to keep the amount of such additives relatively low to reduce any risk of blistering and stress induced cracking.

Advantageously the stabilizer comprises at least one antioxidant preferably comprising at least one phosphate based antioxidant and/or at least one phenol based antioxidant with improved stability in hot/wet and hot/dry environments. Such stabilizers are well known in the art and the skilled person can select a suitable antioxidant by following standard selection procedures. A preferred stabilizer includes 3,3'3',5,5',5'-hexa-tert-butyl-A,A',A'-(mesitylene-2,4,6-triyl)tri-p-cresol.

The stabilizing agents may for example serve to improve the properties of the modified polyethylene compound in respect of e.g. resistance to oxidation and resistance to degradation by hydrolysis.

In an embodiment the modified polypropylene compound comprises pigments, the pigments preferably comprises UV absorbing pigments. Such pigments are usually added in the form of a master batch.

In an embodiment the modified polypropylene compound comprises up to about 10% or other compounded polymer(s). Advantageously the modified polypropylene compound comprises less than 5% by weight of additional compounded polymers and most preferably the modified polypropylene compound is substantially free of additional compounded polymers. The phrase "additional compounded polymers" is used to mean other compounded polymers than the base polypropylene and the plastomer.

In an embodiment the modified polypropylene compound comprises up to about 25% by weight of reinforcement material(s) and/or filler material(s). The filler material may for example serve to improve the properties in respect of strength, flexibility and/or thermal insulation.

The reinforcement material(s) advantageously comprises fibers preferably selected from glass fibre, mineral fibre, metal fibre or any combinations thereof. The reinforcement fiber may be in the form of a mat of woven or nonwoven fibers embedded in the modified polypropylene compound. In an embodiment the fibers are in the form of endless fibers or cords of fibers (i.e. fibers in very long lengths, such as 10 cm or longer, such as 1 m or longer, such as 10 m or longer.) In an embodiment the polypropylene based layer is wound from a tape comprising said modified polypropylene compound and embedded endless fibers or cords of fibers cords, wherein the fibers are predominantly oriented in the length direction of the tape.

In an embodiment the filler material(s) is selected from glass beads, glass particles, nano particles, talcum, carbonates, mica, silicates, oxides, metal particles and any combinations thereof. The filler material may for example serve to increase thermal properties, barrier properties and/or to react with $H_2S$ and/or $CO_2$ e.g. as described in EP 2 296 871.

As described the unbonded flexible pipe 1 of the invention may comprise several polymer layers 4 and in practice any of these polymer layers 4 may be a polypropylene based layer as described herein. In an embodiment the unbonded flexible pipe 1 comprises two or more polypropylene based layers 4 which may be equal or different from each other.

In an embodiment the polypropylene based layer is an extruded layer. Due to the modified properties of the modified polypropylene compound it has been found the modified polypropylene compound is relatively simple to extrude and at the same time a very smooth surface of the extruded polypropylene based layer may be obtained. This property is highly desired because such extruded layers are extruded in long lengths and usually it is required that the extrusion must be continuous in the whole length of the pipe without any substantially visible flaws. The extruded polypropylene based layer may have any thickness in dependence on the requirement to the layer and provided that it is not too thick to render the pipe inflexible. Advantageously the extruded polypropylene based layer has a thickness of from about 0.1 mm to about 30 mm, such as from about 1 mm to about 20 mm.

In an embodiment the extruded polypropylene based layer is permeable to fluids, e.g. by providing the layer as a porous layer or by providing holes in the extruded layer.

In an embodiment the extruded polypropylene based layer is liquid impermeable.

In an embodiment the polypropylene based layer forms the outermost sheath of the unbonded flexible pipe, and in this embodiment the modified polyethylene compound is preferably extruded onto an outer armour layer or onto an insulation layer of the unbonded flexible pipe. The modified polyethylene compound has proven to have excellent properties to function as an outermost sheath of the unbonded flexible pipe due to the layer's high resistance to degradation. When the modified polyethylene compound is applied to form a polypropylene based outer sheath, the layer preferably has a thickness in the range from about 4 mm to about 25 mm. The outer sheath is advantageously substantially liquid impermeable and is able to resist ingress of water.

In an embodiment the polypropylene based layer forms a pressure sheath of the unbonded flexible pipe. The pressure sheath—sometimes also called the liner or inner liner—has the function of preventing outflow of fluids transported in the pipe and the pressure sheath defines the bore. The polypropylene based layer has very advantageous properties in respect of functioning as a pressure sheath. The modified polyethylene compound has a good heat tolerance and is resistance to the chemical substances usually present in oil and gas. When the modified polyethylene compound is applied to form a polypropylene based pressure sheath, the layer is preferably a substantially fluid-tight layer. Preferably the polypropylene based layer forming the pressure sheath has a thickness in the range from about 4 mm to about 25 mm.

In an embodiment the pipe comprises at least one metal based armour layer and at least one liquid impervious polymer layer and the wound polypropylene based layer is applied between the metal based armour layer of the pipe and the liquid impervious polymer layer.

In an embodiment the metal based armour layer is a carcass and the at least one liquid impervious polymer layer is a pressure sheath, the wound polypropylene based layer being positioned between the carcass and the pressure sheath.

In an embodiment the polypropylene based layer is a wound layer, such as a layer wound from one or more tapes. The tapes may in principle have any thickness, but in order to be able to apply the tape to provide a desired even surface the tape advantageously has a thickness of up to about 10 mm, and preferably in the range from about 0.1 to about 3 mm.

The polypropylene based layer may be an intermediate layer and in such case it may be extruded or wound or a combination thereof.

In an embodiment the polypropylene based layer is a thermal insulating layer. The term "insulating" is herein used to designate the thermal properties unless anything else is specified. The unbonded flexible pipe may in an embodiment comprise one or more of such thermal insulating layers. It has been found that the polypropylene based layer is highly advantageous for use as a thermal insulation layer in particularly due to its advantageous properties with respect to high stability, high degradation resistance and low heat transmission. The thermal insulation layer may advantageously have a thickness in the range from about 2 mm to about 30 mm. To increase the insulation properties the polypropylene based insulation layer may for example comprise embedded glass beads and or it may be porous and/or the insulation layer may be shaped as described in WO2014/032674. The polypropylene based insulation layer may be extruded and/or wound, liquid pervious or liquid impervious. In general it is desired that the polypropylene based insulation layer is liquid pervious in order to avoid an undesired pressure build-up e.g. in the annulus or elsewhere the polypropylene based insulation layer is located.

In an embodiment the polypropylene based layer is an intermediate sheath between armour layers of the unbonded flexible pipe whereby the polypropylene based layer for example may serve to protect the armour layer due to the excellent strength of the polypropylene based layer. In an embodiment the polypropylene based layer is an intermediate liquid impervious sheath. When the modified polypropylene based layer is an intermediate sheath, the layer preferably has a thickness in the range from about 1 mm to about 10 mm.

In an embodiment the wound polypropylene based layer comprises a wound layer of a tape comprising the modified polypropylene compound coated onto a tape support of another material, such as a tape support of another polymer material and/or a metal foil and/or of a woven or nonwoven fiber material. Such wound tape may form part or constitute an insulating layer and or a reinforcing layer. The types of support tapes which may be coated with the modified polyethylene compound to profile the wound tape layer may e.g. be the support tapes disclosed in PCT/DK2013/050267, WO 2013/044920 or EP 1269057. When the modified polyethylene compound is applied as a coating layer onto a support tape, the coated layer preferably has a thickness in the range from about 0.1 mm to about 2 mm.

EXAMPLES

Example 1

Preparing an Outer Sheath for an Embodiment of an Unbonded Flexible Pipe of the Invention For the preparation of an outer sheath, the following components are used:

Base polypropylene: A polypropylene having a MFI of 8 g/min (2.16 kg/10 min at 230° C.) and a density of 0.902 g/cm$^3$, delivered as pellets (ASI Polypropylene 1255-01 Homopolymer from the company A. Schulman Inc.; USA).

Plastomer: An ethylene octene plastomer having a MFI of 10 g/min (2.16 kg/10 min at 230° C.) and a density of 0.882 g/min, delivered as pellets (EXACT™ 8210 from the company ExxonMobil Chemical; Europe).

Stabilizer 1: A phenolic stabilizer composition SONG-NOX 2246, powder composition (based on phenols and obtainable from company SONGNOX; South Korea).

Stabilizer 2: A hindered amine light stabilizer SABO™ STAB 70, powder composition (obtainable from company SONGNOX; South Korea.

An polypropylene based layer is prepared with the above components in the following amounts.

| | |
|---|---|
| Base polypropylene | 87% |
| Plastomer | 9% |
| Stabilizer 1 | 3.2% |
| Stabilizer 2 | 0.8% |

An unbonded flexible pipe of 6" inner diameter (15.2 cm) is produced. The unbonded flexible pipe comprises a steel carcass surrounded by an internal pressure sheath of polypropylene surrounded by a pressure armour wound from steel wire. Around the pressure armour are wound two layers of tensile armour made from steel wires. Before applying the outer sheath of modified polypropylene compound the pipe has an outer diameter of approximately 28.4 cm.

The above components are transferred into a pre-mixer in which the blend is mixed and melted (compounded) at a temperature of approximately 220° C., before it is transferred to the extruder.

The extruder is a conventional single screw extruder suitable for polyolefin extrusion with a 120 mm screw diameter and a typical L/D ratio of 30. The temperature setting on the heating zones of the extruder and head ranges from 180° C. to 240° C., and melt temperature is typically 210° C.

The resulting extruded layer (outer sheath) has a thickness of approximately 6 mm.

The outer sheath comprising the polypropylene based layer:
Density: 0.9 g/cm$^3$
Oxidation induction time: 104 min (OIT according to ASTM D 3895)
Yield Strength: 24.3 MPa
Yield Strain: 12.1%

Example 2

Preparing an Intermediate Sheath for an Embodiment of an Unbonded Flexible Pipe of the Invention An intermediate sheath is prepared using the following components:
Base polypropylene: A polypropylene having a MFI of 5 g/min (2.16 kg/10 min at 230° C.) and a density of 0.909 g/cm$^3$, delivered as pellets (ASI Polypropylene 3486-01 Homopolymer from the company A. Schulman Inc. USA).
Plastomer: A polyolefin plastomer having a MFI of 5, delivered as pellets (2.16 kg/10 min at 230° C.) and a density of 0.870 g/cm$^3$ (AFFINITY™ EG8200G from the company DOW; USA).
Stabilizer: A phenolic stabilizer composition SONGNOX 2246, powder composition (based on phenols and obtainable from company SONGNOX China).
Filler: Glass fiber (milled glass fibers obtainable from PMI Plastic Materials Inc.; USA).

A polypropylene based layer is prepared with the above components in the following amounts.

| | |
|---|---|
| Base polypropylene | 55% |
| Plastomer | 37% |
| Stabilizer | 2.5% |
| Filler | 5.5% |

An inner part of an unbonded flexible pipe of 6" inner diameter (15.2 cm) is produced. The inner part of the unbonded flexible pipe comprises a steel carcass surrounded by an internal pressure sheath of polypropylene surrounded by a pressure armour wound from steel wire. Around the pressure armour is applied an intermediate sheath intended to serve as an intermediate sheath between the pressure armour and a tensile armour to be applied after the application of the intermediate sheath. Before applying the intermediate sheath of modified polypropylene, the pipe inner part has an outer diameter of approximately 22.4 cm.

The above components are transferred into a pre-mixer in which the blend is mixed and melted at a temperature of approximately 210° C., before it is transferred to the extruder.

The extruder is a conventional polyethylene single screw extruder with a 120 mm screw diameter and an L/D ratio of 30, with a standard screw. The temperature setting on the heating zones of the extruder and head ranges from 180 to 240° C., and melt temperature is typically 210° C.

The resulting extruded layer in the form of the intermediate sheath has a thickness of approximately 5 mm.

The intermediate sheath comprising the polypropylene based layer:
Density: 0.895 g/cm$^3$
Oxidation induction time: 99 min (OIT according to ASTM D 3895)
Yield Strength: 26.8 MPa
Yield Strain: 9.4%

The intermediate sheath serves to protect the armour layers and have good properties in this respect. Moreover, the intermediate sheath provides thermal insulation.

Example 3

Preparation of a Coating Layer for a Support Tape to be Used for a Layer of an Embodiment of a Pipe of the Invention For the purpose of preparing a coating layer onto a support tape the following components were provided.
Base polypropylene: A polypropylene random copolymer having a MFI of 0.25 g/min (2.16 kg/10 min at 230° C.) and a density of 0.905 g/cm$^3$, delivered as pellets (PP RA130E from company Borealis (Borouge Pte Ldt—Borealis Group); Sweden).
Plastomer: A polyolefin plastomer having a MFI of 5 (2.16 kg/10 min at 230° C.) and a density of 0.870 g/cm$^3$, delivered as pellets (AFFINITY™ EG8200G from the company DOW Chemicals; USA).
Stabilizer: A phenolic stabilizer composition SONGNOX 2246, powder composition (based on phenols and obtainable from company SONGNOX China).
Filler: Glass fiber (milled glass fibers obtainable from PMI Plastic Materials Inc.; USA)

| | |
|---|---|
| Polypropylene | 87.5% |
| Polyolefin co-polymer plastomer | 9% |
| Stabilizer | 1% |
| Filler | 2.5% |

The above components are transferred into a pre-mixer in which the blend is mixed and melted at a temperature of approximately 210° C.

A support tape manufactured as disclosed in WO 03/044414 A and having a width of approximately 10 cm and a thickness of approximately 0.5 cm is applied with a coating of the melted mixture. The mixture is applied with a heated nozzle having a temperature of approximately 190° C. After application the coating is allowed to cure at ambient temperature.

The applied coating has a thickness of from approximately 0.5 mm to approximately 1.0 mm and provides wear resistance to the tape.

The invention claimed is:

1. An unbonded flexible pipe for subsea transportation of fluids, the pipe has a length and a centre axis and comprises a plurality of layers comprising at least one polypropylene based layer comprising a modified polypropylene compound comprising:
   at least about 50% by weight of a base homopolymer polypropylene (base PP), and
   from about 1% to about 15% by weight of a plastomer comprising a copolymer of propylene and at least one co-monomer selected from C4 to C20 alpha olefins
wherein the polypropylene based layer is a wound layer having thickness from about 0.1 mm to about 10 mm.

2. The flexible pipe of claim 1, wherein the base PP has a Melt Flow Index (MFI) of from about 0.1 to about 8.0 g/10 min (2.16 kg/10 min at 230° C.).

3. The flexible pipe of claim 1, wherein the base PP has a tensile strength of at least about 12 MPa determined according to ASTM D638.

4. The flexible pipe of claim 1, wherein said modified polypropylene compound comprises at least about 60% by weight of said base PP.

5. The flexible pipe of claim 1, wherein said plastomer is a propylene based plastomer comprising at least 50% by weight of polypropylene.

6. The flexible pipe of claim 1, wherein said plastomer is a propylene based plastomer comprising ethylene comonomer.

7. The flexible pipe of claim 1, wherein said plastomer has a MFI of from about 2.0 to about 15.0 g/10 min (2.16 kg/10 min at 190° C.).

8. The flexible pipe of claim 1, wherein said base PP has a tensile strength at yield which is larger than the tensile strength at yield of the plastomer.

9. The flexible pipe of claim 1, wherein said modified polypropylene compound comprises from about 2% by weight to about 9% by weight of the plastomer.

10. The flexible pipe of claim 1, wherein the pipe comprises at least one metal based armour layer and at least one liquid impervious polymer layer, said metal based armour layer is a carcass and the at least one liquid impervious polymer layer is a pressure sheath, the polypropylene based layer is a wound polypropylene based layer positioned between said carcass and said pressure sheath.

11. An unbonded pipe for subsea transportation of fluids, the pipe has a length and a centre axis and comprises a plurality of layers comprising at least one polypropylene based layer comprising a modified polypropylene compound comprising:
   at least about 50% by weight of a base homopolymer polypropylene (base PP), and
   from about 1% to about 15% by weight of a plastomer comprising a copolymer of propylene and at least one co-monomer selected from C4 to C20 alpha olefins,
wherein the pipe comprises at least one metal based armour layer and at least one liquid impervious polymer layer and wherein a wound polypropylene based layer is applied between said metal based armour layer of the pipe and said liquid impervious polymer layer.

12. An unbonded flexible pipe for subsea transportation of fluids, the pipe has a length and a centre axis and comprises a plurality of layers comprising at least one polypropylene based layer comprising a modified polypropylene compound consisting of:
   at least about 50% by weight of a base homopolymer polypropylene (base PP), and
   from about 1% to about 15% by weight of a copolymer of propylene and at least one monomer selected from C4 to C20 alpha olefins;
   up to about 10% by weight of other compounded polymer;
   up to about 25% by weight of reinforcement material and/or filler material and
   up to about 5% by weight of stabilizer.

13. The flexible pipe of claim 12, wherein the polypropylene based layer is an extruded layer having a thickness of from about 1 mm to about 20 mm.

14. The flexible pipe of claim 12, wherein the polypropylene based layer forms an outermost polymer sheath of said pipe.

15. The flexible pipe of claim 12, wherein polypropylene based layer forms a pressure sheath of said pipe.

16. The flexible pipe of claim 12, wherein the polypropylene based layer forms a thermal insulation layer of said pipe.

* * * * *